(12) United States Patent
Wang

(10) Patent No.: US 8,838,142 B2
(45) Date of Patent: Sep. 16, 2014

(54) METHOD AND SYSTEM FOR INQUIRING POSITION INFORMATION OF MOBILE TERMINAL

(75) Inventor: Yingxuan Wang, Huizhou (CN)

(73) Assignee: Huizhou TCL Mobile Communication Co., Ltd, Huizhou, Guangdong (CN)

( * ) Notice: Subject to any disclaimer, the term of this patent is extended or adjusted under 35 U.S.C. 154(b) by 46 days.

(21) Appl. No.: 13/513,511

(22) PCT Filed: May 18, 2011

(86) PCT No.: PCT/CN2011/074249
§ 371 (c)(1),
(2), (4) Date: Jun. 1, 2012

(87) PCT Pub. No.: WO2012/022179
PCT Pub. Date: Feb. 23, 2012

(65) Prior Publication Data
US 2012/0282949 A1  Nov. 8, 2012

(30) Foreign Application Priority Data

Aug. 18, 2010 (CN) .......................... 2010 1 0261545

(51) Int. Cl.
*H04W 4/02* (2009.01)
*H04W 4/20* (2009.01)
*H04W 4/14* (2009.01)

(52) U.S. Cl.
CPC . *H04W 4/20* (2013.01); *H04W 4/02* (2013.01); *H04W 4/14* (2013.01)
USPC .......................... 455/456.2; 370/225; 235/375

(58) Field of Classification Search
CPC . H04W 64/00; H04L 29/08108; H04L 45/02; G06Q 30/02
USPC .................... 455/456.2, 414.1; 370/225, 401; 235/375
See application file for complete search history.

(56) References Cited

U.S. PATENT DOCUMENTS 8,285,306 B2 * 10/2012 Ni ............................... 455/456.2
2004/0108375 A1 * 6/2004 Maillard ....................... 235/375
2004/0179539 A1 * 9/2004 Takeda et al. ................. 370/401

FOREIGN PATENT DOCUMENTS

| CN | 1855092 A | 11/2006 |
|---|---|---|
| CN | 101378532 A | 3/2009 |
| CN | 101668074 A | 3/2010 |
| CN | 101742403 A | 6/2010 |
| CN | 101938693 A | 1/2011 |

* cited by examiner

Primary Examiner — Phuoc H Doan
(74) Attorney, Agent, or Firm — Shimokaji & Associates P.C.

(57) ABSTRACT

The invention relates to the technical field of mobile terminal technology and discloses a method and system for inquiring position information of a mobile terminal. The mobile terminal receives a position inquiry request input by a user, creates a first short message according to the position inquiry request, and sends the first short message and an ID of the mobile terminal to a server, where the message header of the first short message has a corresponding code that is used for identifying the position inquiry request. The server interprets the first short message to obtain the position inquiry request, obtains the position information of the mobile terminal according to the ID of the mobile terminal, creates a second short message according to the obtained position information, and returns the second short message to the mobile terminal, where the second short message contains the position information in a system-defined format.

15 Claims, 2 Drawing Sheets

METHOD AND SYSTEM FOR INQUIRING POSITION INFORMATION OF MOBILE TERMINAL

TECHNICAL FIELD OF THE INVENTION

The present invention relates to the technical field of mobile terminal technology, and in particular to a method and system for inquiring position information of the mobile terminal.

BACKGROUND OF THE INVENTION

With the continuous development of mobile terminal technology, users have increasing requirements on functions of mobile terminals.

In the existing Global Positioning System (GPS), it is necessary to utilize a satellite navigation system to perform positioning. The cost is quite high. As a result, the cost of each unit of GPS equipment is increased, the popularization is of GPS is influenced, and it is rather cumbersome for users when they need position information.

On the other hand, mobile phones are getting more and more popular in the public due to inexpensive price and good practicality.

Ways to combine the existing mobile terminals to obtain position information in order to reduce cost and improve efficiency is one of the research directions of the technical field of mobile terminals.

SUMMARY OF THE INVENTION

An object of the present invention is to provide a method for inquiring position information of a mobile terminal, in order to combine the existing mobile terminals to obtain position information and to reduce cost.

According to one aspect of the present invention, a method for inquiring position information of a mobile terminal includes the steps of: a mobile terminal receiving a position inquiry request input by a user, creating a first short message according to the position inquiry request, and sending the created first short message and an ID of the mobile terminal to a server, wherein the message header of the first short message has a corresponding code that is used for identifying the position inquiry request; and the server interpreting the first short message to obtain the position inquiry request, obtaining the position information of the mobile terminal according to the ID of the mobile terminal, creating a second short message according to the obtained position information, and returning the second short message to the mobile terminal, wherein the second short message includes the position information in a system-defined format.

According to another aspect of the present invention, a system for inquiring position information of a mobile terminal includes a server and at least one mobile terminal, where: the mobile terminal is configured to receive a position inquiry request input by a user, create a first short message according to the position inquiry request, and send the created first short message and is an ID of the mobile terminal to a server, wherein the message header of the first short message has a corresponding code that is used for identifying the position inquiry request, and the server is configured to interpret the first short message to obtain the position inquiry request, obtain the position information of the mobile terminal according to the ID of the mobile terminal, create a second short message according to the obtained position information, and return the second short message to the mobile terminal, wherein the second short message includes the position information in a system-defined format.

According to a further aspect of the present invention, a mobile terminal adapted to inquire position information is configured to: receive a position inquiry request input by a user; create a first short message according to the position inquiry request; and send the created first short message and an ID of the mobile terminal to a server, where the message header of the first short message has a corresponding code that is used for identifying the position inquiry request.

In some embodiments of the invention, a mobile terminal creates a first short message after receiving a position inquiry request from a user and sends it to the server; the server interprets the first short message to obtain corresponding position information, creates a second short message and returns it to the mobile terminal. Thus, the user can obtain position information conveniently and quickly, expenses are greatly saved, and the popularization of mobile terminals is facilitated.

DETAILED DESCRIPTION OF THE INVENTION

To make the objects, technical solutions and advantages of the invention more clear, the invention will be further described in details below with reference to drawings and embodiments. It should be understood that specific embodiments described herein are only used for explaining the invention, instead of limiting the invention.

Figure 1:
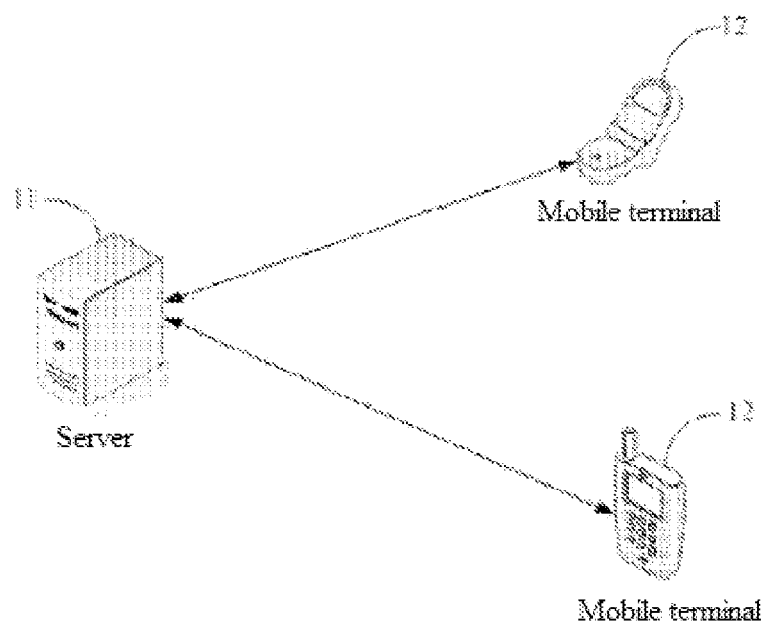
FIG. 1 is a structure diagram of a system for inquiring position information of a mobile terminal, provided in an embodiment of the present invention.

FIG. 1 is a structure diagram of a system for inquiring position information of a mobile terminal, provided in an embodiment of the invention. The system includes a server 11 and at least one mobile terminal 12.

The mobile terminal 12 receives a position inquiry request input by a user, creates a first short message according to the position inquiry request, and sends the created first short message and an ID of the mobile terminal 12 to the server.

The message header of the first short message has a corresponding code that is used for identifying the position inquiry request, and the ID of the mobile terminal includes a Cell ID of the mobile terminal or a hotspot ID in a WiFi.

The server 11 interprets the first short message to obtain the position inquiry request, obtains the position information of the mobile terminal 12 according to the ID of the mobile terminal 12, creates a second short message according to the obtained position information, and returns the second short message to the mobile terminal 12.

The second short message contains the position information in a system-defined format.

The mobile terminal 12 receives and interprets the second short message to obtain the position information in the second short message, and displays the obtained position information in a system-defined format.

Preferably, when displaying the position information, the mobile terminal 12 displays coordinates of the position information at a corresponding position on a background map.

Figure 2:
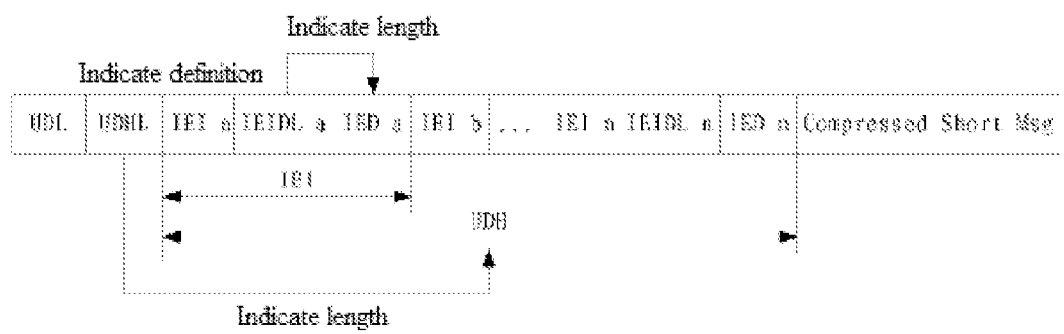
FIG. 2 is a structure diagram of a short message provided in an embodiment of the invention.

Taking a mobile phone as an example, the process that the mobile phone uses to create a first short message is described below with reference to FIG. 2, which illustrates a complete short message structure. Compressed Short Msg in the drawing represents a specific short message text.

One combination of IEI n, IEID n, IED n (n=1, 2, 3, 4 . . . ) is one Information Element Identifier (IEI), and multiple IEIs form a message header UDH.

According to the short message protocol in 3GPP, a value of IEI n (n=1, 2, 3, 4 . . . ) defines the use of the IEI, where the value range is 00-FF. For example, IEI 1=00, indicates that the IEI is one short message control parameter. However, values such as 02 and 26-6F are retention values that are not defined. One of the retention values may be selected to define one IEI, so that it indicates that this short message is a position inquiry request short message (for example, IEI n=26). IED n is a current Cell-ID value or an ID value of the hotspot in the WiFi, and IEIDL n represents the length of the Cell-ID value.

Mobile phones usually can save or read information related to the current network, such as LAC and Cell-ID. For example, one data structure in the MTK platform is saved with information such as LAC and Cell ID. The related elements of the data structure may be directly read to obtain the corresponding data.

Usually, all mobile phone platforms may obtain the Cell ID, for example, in an MTK platform, the Cell ID is in the following structure:
typedef struct
{14c_context_struct*14c_ptr;}
layer4_context_struct;
extern layer4_context_struct*layer4_ptr_g;
The value may be obtained by a pointer: layer4_ptr_g→14c_ptr→hz_ptr→current_cell_id.

The hotspot ID in the WiFi also may be obtained in a similar way.

Cell ID refers to a cell identifier used for recognizing the cell of the current network where the mobile phone user is located, and is usually a string of is digits. The corresponding database of the server is saved with the Cell-ID of each cell and the corresponding position information. This information may be translated into latitude and longitude to determine the position of the user. If the hotspot ID in the WiFi is used, the principle thereof is similar. Each hotspot has one globally unique ID number, and the server may inquire coordinates of each hotspot recorded in the database according to the ID so as to obtain the position information.

The mobile phone creates a short message requesting the current position information, the position (the current Cell ID or hotspot ID in the WiFi) inquiry request is represented in the message header with the corresponding code, and the short message is sent to the address of the server.

There are three ways to implement the Cell ID positioning application, two of which are network-based ways:
a) network-based way 1: a way following the GSM03.71 protocol; and
b) network-based way 2: a way using the MAP ATI signaling and following the 3GPP TS 09.02 protocol.

The positioning of the hotspot ID in the WiFi is used to inquire in the database of the server according to the hotspot ID to obtain coordinates of the corresponding hotspot.

After receiving the first short message from the mobile phone, the server reads a value of each IEI in the message header one by one, and when a certain IEI=26 is found, it is indicated that this short message is a position inquiry request. The server will respond to the position inquiry request sent by the mobile phone, and create and reply with a second short message. A message header of the second short message also contains a field IEI=26, the message body (that is, Compressed short Msg field) includes coordinate position information in a fixed format, (for example: 3256.55N, 1133.43E).

What is received by the mobile phone is the second short message, the IEI of which is 26 and the message body of which is the above coordinates.

After receiving the second short message, the mobile phone interprets it. When IEI=26 is found, it can be confirmed that this short message is returned position information, and contents in the message body are the specific contents of the coordinates.

Preferably, to make the user see the position information more intuitively, the coordinate data in the returned position information may be correlated with an electronic map application program. That is, the coordinates are transferred to the electronic map application program, and the application program labels the current position on the map according to the coordinates.

Figure 3:
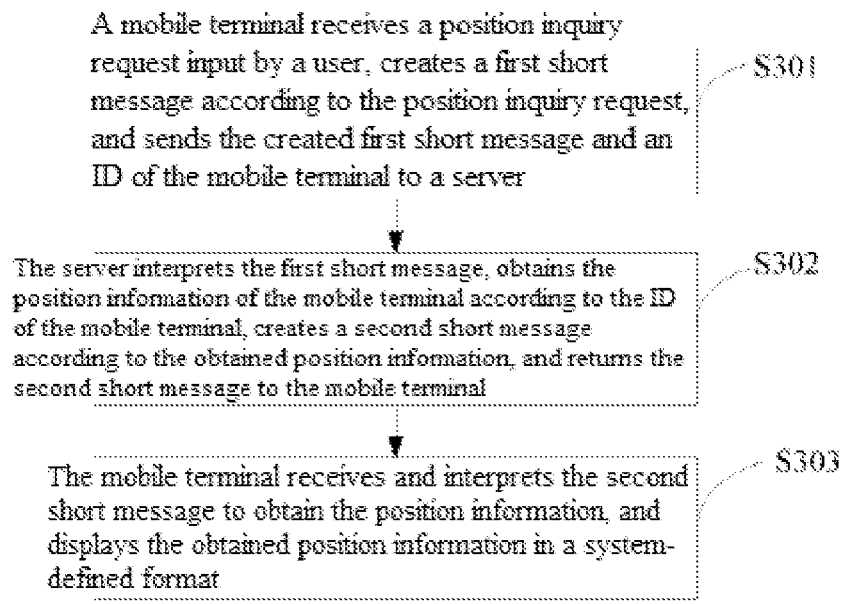
FIG. 3 is a flow chart of a method for inquiring position information of a mobile terminal, provided in an embodiment of the invention.

FIG. 3 illustrates a flow chart of a method for inquiring position information of a mobile terminal, provided in an embodiment of the invention.

In step S301, a mobile terminal receives a position inquiry request input by a user, creates a first short message according to the position inquiry request, and sends the created first short message and an ID of the mobile terminal to a server.

The message header of the first short message has a corresponding code that is used for identifying the position inquiry request.

In step S302, the server interprets the first short message to obtain the position inquiry request, obtains the position information of the mobile terminal according to the ID of the mobile terminal, creates a second short message according to the obtained position information, and returns the second short message to the mobile terminal.

The second short message contains the position information in a system-defined format.

The ID of the mobile terminal includes a Cell ID of the mobile terminal or a hotspot ID in the WiFi.

In step S303, the mobile terminal receives and interprets the second short message to obtain the position information in the second short message, and displays the obtained position information in a system-defined format.

Preferably, when displaying the position information, the mobile terminal displays coordinates of the position information at a corresponding position on a background map.

In the embodiment of the invention, a mobile terminal creates a first short message after receiving a position inquiry request from a user and sends it to the server; the server interprets the first short message to obtain corresponding position information, creates a second short message and returns it to the mobile terminal. Thus, the user can obtain position information to be inquired conveniently and quickly, expenses are greatly saved, and the popularization of mobile terminals is facilitated.

It should be understood that, for those skilled in the art, the invention may have modifications or alternations according to the above description, and these modifications and alternations should be included within the protection scope defined by the claims of the invention.

The invention claimed is:
1. A method for inquiring position information of a mobile terminal, wherein the method comprises the steps of:
   a mobile terminal receiving a position inquiry request input by a user,
   creating a first short message according to the position inquiry request, and sending the created first short message and an ID of the mobile terminal to a server, wherein the first short message has a message header including a first corresponding code capable of being used to identify the position inquiry request, a second corresponding code indicative of the length of the ID of the mobile terminal, and a third corresponding code indicative that a fourth corresponding code indicates a type of short message;

the server interpreting the first short message to obtain the position inquiry request;

obtaining the position information of the mobile terminal according to the ID of the mobile terminal;

creating a second short message according to the obtained position information;

returning the second short message to the mobile terminal, wherein the second short message includes the position information in a system-defined format; and displaying coordinates of the position information at a corresponding position on a background map.

2. The method for inquiring position information of a mobile terminal according to claim 1, wherein the ID of the mobile terminal comprises a Cell ID of the mobile terminal or a hotspot ID in a WiFi.

3. The method for inquiring position information of a mobile terminal according to claim 1, wherein, after the server sends the second short message to the mobile terminal, the method further comprises: the mobile terminal receiving and interpreting the second short message to obtain the position information in the second short message; and the mobile terminal displaying the obtained position information in a system-defined format.

4. The method for inquiring position information of a mobile terminal according to claim 1, wherein the position information includes the result of a translation into longitude and latitude.

5. The method for inquiring position information of a mobile terminal according to claim 1, wherein the message header of the first short message comprises a plurality of information element identifiers (IEIs).

6. The method for inquiring position information of a mobile terminal according to claim 1, wherein at least one IEI in the plurality of IEIs includes the corresponding code.

7. A system for inquiring position information of a mobile terminal, comprising a server and at least one mobile terminal, wherein:

the mobile terminal is configured to receive a position inquiry request input by a user, create a first short message according to the position inquiry request, and send the created first short message and an ID of the mobile terminal to a server, wherein the message header of the first short message has a corresponding code that is used for identifying the position inquiry request, a corresponding code that indicates the length of the ID of the mobile terminal, and a corresponding code that indicates the length of the message header;

the server is configured to interpret the first short message to obtain the position inquiry request, obtain the position information of the mobile terminal according to the ID of the mobile terminal, create a second short message according to the obtained position information, and return the second short message to the mobile terminal, wherein the second short message includes the position information in a system-defined format; and the mobile terminal is configured to display coordinates of the obtained position information at a corresponding position on a background map.

8. The system for inquiring position information of a mobile terminal according to claim 7, wherein the ID of the mobile terminal comprises a Cell ID of the mobile terminal or a hotspot ID in a WiFi.

9. The system for inquiring position information of a mobile terminal according to claim 7, wherein the mobile terminal is further configured to receive and interpret the second short message to obtain the position information in the second short message and display the obtained position information in a system-defined format.

10. The system for inquiring position information of a mobile terminal according to claim 7, wherein the position information includes the result of a translation into longitude and latitude.

11. The system for inquiring position information of a mobile terminal according to claim 7, wherein the message header of the first short message comprises a plurality of information element identifiers (IEIs).

12. The system for inquiring position information of a mobile terminal according to claim 11, wherein at least one IEI in the plurality of IEIs includes the corresponding code.

13. A mobile terminal adapted to inquire position information, wherein the mobile terminal is configured to:

receive a position inquiry request input by a user to the mobile terminal;

create a short message according to the received position inquiry request; and send the created short message and an ID of the mobile terminal to a server, wherein a message header of the short message has a corresponding code that can be used for identifying the received position inquiry request, and the message header of the short message has a corresponding code indicative of the length of the ID of the mobile terminal;

interpret the second short message to obtain position information of the mobile terminal;

translate the position information into latitude and longitude; and display the position information at a corresponding position on a background map.

14. The mobile terminal of claim 13, wherein the ID of the mobile terminal comprises a Cell ID of the mobile terminal or a hotspot ID in a WiFi.

15. The mobile terminal of claim 13, wherein the mobile terminal is further configured to:

interpret the second short message to obtain the position information of the mobile terminal; and display the obtained position information in a system-defined format.

* * * * *